United States Patent [19]
Loveless et al.

[11] Patent Number: 5,704,956
[45] Date of Patent: Jan. 6, 1998

[54] FILTER CLEANING SYSTEM FOR AN ASH VACUUM

[76] Inventors: Michael L. Loveless; Colleen G. Loveless, both of 449 E. 200 North, Price, Utah 84501

[21] Appl. No.: 607,086

[22] Filed: Feb. 26, 1996

[51] Int. Cl.⁶ .................................................. B01D 46/04
[52] U.S. Cl. ........................ 55/305; 15/352; 55/380; 55/482; 55/DIG. 3
[58] Field of Search ........................... 95/278, 282, 286, 95/287; 55/305, 304, 300, 299, 380, 482, DIG. 3; 15/347, 352

[56] References Cited

U.S. PATENT DOCUMENTS

| | | | |
|---|---|---|---|
| 897,342 | 9/1908 | Boegel | 55/295 |
| 1,946,665 | 2/1934 | Bieth | 55/305 |
| 2,077,572 | 4/1937 | Lofgren | 55/274 |
| 2,211,934 | 8/1940 | McAllister | 55/305 |
| 2,372,944 | 4/1945 | Forsberg | 55/305 |
| 2,531,920 | 11/1950 | Raminger | 15/327.1 |
| 2,558,429 | 6/1951 | Gerber | 55/305 |
| 3,358,316 | 12/1967 | Okun | 15/352 |
| 3,568,413 | 3/1971 | Jerubek | 55/288 |
| 3,653,189 | 4/1972 | Miyake et al. | 55/304 |
| 3,653,190 | 4/1972 | Lee et al. | 55/302 |
| 4,072,483 | 2/1978 | Doyle, Jr. | 55/372 |
| 4,342,131 | 8/1982 | Reid | 15/327 D |
| 4,355,434 | 10/1982 | Gongwer | 15/327 R |
| 4,363,674 | 12/1982 | Fullenwider | 15/301 |
| 4,476,608 | 10/1984 | Rasmussen | 15/353 |
| 4,533,371 | 8/1985 | Nakamura | 55/305 |
| 4,613,348 | 9/1986 | Natale | 55/318 |
| 4,704,764 | 11/1987 | Metelke, Jr. | 15/301 |
| 4,868,949 | 9/1989 | Loveless et al. | 15/352 |
| 5,090,083 | 2/1992 | Wulff | 15/347 |
| 5,259,087 | 11/1993 | Loveless et al. | 15/327.6 |

FOREIGN PATENT DOCUMENTS

| | | | |
|---|---|---|---|
| 52-28170 | 3/1977 | Japan | 55/304 |
| 52-44061 | 4/1977 | Japan | 55/304 |
| 54-100148 | 8/1979 | Japan | 55/305 |
| 54-109256 | 8/1979 | Japan | 55/304 |
| 1183153 | 10/1985 | U.S.S.R. | 55/304 |
| 1755881 | 8/1992 | U.S.S.R. | 55/304 |
| 294501 | 7/1928 | United Kingdom. | |
| 421664 | 12/1932 | United Kingdom. | |
| 449828 | 7/1936 | United Kingdom. | |
| 653033 | 5/1951 | United Kingdom. | |
| 2219524 | 12/1989 | United Kingdom. | |

Primary Examiner—Duane S. Smith
Attorney, Agent, or Firm—M. Reid Russell

[57] ABSTRACT

A filter cleaning system for a vacuum that includes a housing that is open across its top end and is arranged to be covered by a removable lid whereon is mounted a vacuum source. The housing includes a hose port for connection to a vacuum hose, and the housing can be mounted on wheels, casters, or the like. A double filter system, that includes separate primary and secondary filters, is arranged within the housing, with the secondary filter mounted across the vacuum source inlet, and with the primary filter, that is a bag connected to the lid undersurface, for containing the secondary filter and a filter support. The filter support is a rigid fame connected at a right angle to an end to a straight rod that extends through the lid to be manipulated by an operator to move the filter support so as to engage surfaces of both the primary and secondary filters, to vibrate and shake collected particles therefrom. The secondary filter is mounted to the lid undersurface over a cage that is spring mounted to the lid, and extends across the vacuum inlet, with the cage to engage when moved a bottom surface of the secondary filter. Thereby, when the filter support strikes the bottom of the secondary filter, that contact will deflect the cage against its spring mounting, with the cage then rebounding to strike the inner face of the secondary filter bottom, further shaking and vibrating that filter bottom so as to dislodge particles therefrom that then fall into the primary filter.

6 Claims, 3 Drawing Sheets

FILTER CLEANING SYSTEM FOR AN ASH VACUUM

BACKGROUND OF THE INVENTION

1. Field of the Invention

The present invention relates to vacuum cleaners for removing burned materials, including even still hot materials, out of a fireplace or stove, and particularly to flame retardant filter systems for such vacuum cleaners with filter shaking arrangements for dislodging collected dust particles therefrom.

2. Prior Art

Removal of ashes and unburned materials from wood burning fireplaces and stoves is often a difficult and messy task for users of such devices. Particularly, live coals can be present in such removed materials that could cause damage to conventional vacuum cleaners, and may even constitute a fire hazard. An earlier ash vacuum adapter of the present inventors, U.S. Pat. No. 4,868,949, shows a canister arrangement for connection to a vacuum source for drawing ashes and coals into a canister, and a later U.S. Pat. No. 5,259,087, sets out an arrangement for shaking dust off from a bag type primary filter threreof. The '949 patent sets out an employment of a filter formed of a fire retardant material and provides a rod that extends to above the canister and connects to a bottom plate whereto the filter is mounted, for shaking the filter, with the '087 patent providing an open box frame as a filter support that the rod is attached to, the filter support to engage to shake the primary filter. Additional to the earlier filter support, the present invention provides a cage for spring mounting to an undersurface of the vacuum motor mount to support a secondary filter fitted thereover. An operator, moving the rod, moves the connected filter support against both the primary and secondary filters, with the secondary filter supported over the cage. The cage, is thereby flexed on its spring mounts, to rebound to strike the bottom of the secondary filter, vibrating and shaking the collected particles therefrom. The dislodged particles to fall to the bottom of the primary filter.

The invention is structurally and functionally similar to the above cited '087 patent and, is structurally different, but will function like the vacuum devices of patents to McAllister, U.S. Pat. No. 2,211,934; to Gongwer, U.S. Pat. No. 4,355,434; to Rasmussen, U.S. Pat. No. 4,476,608, and to Natale, U.S. Pat. No. 4,613,345, that provide for connection of a device to a vacuum source for pulling dust, ashes, or like materials, with some of these patents involving filter arrangements. Further, though unlike the present invention, vacuum devices that include flexible bag type primary filters with filter shaking arrangements are shown in patents to Ierabek, U.S. Pat. No's. 3,358,316 and to Okun, U.S. Pat. No. 3,568,413, an in a United Kingdom Patent to Ruau, No. 294,501. These patents, however, do not provide a secondary filter arranged to be effectively shaken to dislodge collected particles therefrom, without taking the device apart.

SUMMARY OF THE INVENTION

It is a principal object of the present invention in a filter cleaning system for inclusion with a vacuum cleaner that is useful for safely removing ashes and hot and even burning coals from a wood burning fireplace or stove, a rod mounted filter support that is maintained within a primary filter and is connected to a movable cage for engaging a secondary filter, the rod for manual manipulation to engage and shake both the primary filter and the secondary fitted and to strike the cage that the secondary filter is mounted to, shaking collected particles therefrom.

Another object of the present invention is to provide, for a vacuum cleaner that includes a double filter system, a filter support arranged between the filters that is a time that is mounted to a shaker rod that extends out from the canister housing, manual movement of the rod to move the filter support so as to vibrate and shake collected materials off from both the inner secondary and outer primary filters.

Another object of the present invention is to provide, as a primary filter, a bag type filter that is formed from a flame retardant material such that hot and even burning coals can be pulled into the cleaner without presenting a fire hazard, which filter prohibits passage of materials to the inner or secondary filter that is mounted over a spring mounted movable cage that is arranged across a vacuum source inlet.

Still another object of the present invention is to provide a filter assembly, for inclusion with a vacuum cleaner, that both protects the vacuum source from receipt of collected materials, that can be hot or burning coals, and provides a filter support for movement against the primary filter interior that will also strike to cause a movable cage whereto the secondary filter is mounted, to cause the cage to rebound against that secondary filter to shake and dislodge particles collected on the primary and secondary filter.

Still another object of the present invention is to provide a vacuum cleaner that includes a capability for easily and simply removing collected particles from primary and secondary filters without a necessity of opening the vacuum cleaner.

The present invention is for inclusion with a vacuum cleaner that is preferably for use for vacuuming up ashes and even hot coal, that includes a pail or barrel housing, that may be mounted on casters, wheels, or the like, and has a lid arranged for releasably fitting over an open top end. The lid mounts a vacuum source, that is preferably an electric motor that turns a fan to pull an air flow through an open hose connected into the canister, pulling materials into the canister. A filter system is arranged within the housing, mounted across the vacuum inlet, that consists of an interior or secondary filter maintained over a movable spring mounted cage of the invention that is arranged across the vacuum pump inlet, with an outer or primary bag type filter, that contains a filter support, arranged between the outer or primary bag filter and the secondary filter.

The filter support is preferably a frame that is formed for maintaining spacing between the primary bag filter and secondary filter and connects to an end of a rod that extends through the housing passing alongside of the vacuum source, and out of the lid top. The rod is for gripping by an operator to move the rod so as to shake the filter support, stalking the interior surface of the bag type primary filter, and the outer surface of the secondary filter, with the force of that striking translated into the movable cage that, in turn, flexes against its spring mounting to rebound against the inside of the secondary filter. The rebounding cane to shake and vibrate the secondary filter so as to dislodge particles therefrom that fall into the primary filter. A rod cover is provided for positioning over the rod end for maintaining the vacuum within the housing during operation, which rod cover is easily removable by an operator who can then grip the rod end to shake the filter support.

The ash vacuum of the present invention is intended to be utilized to vacuum up ashes and even hot and smoldering coals, and to this end includes a hose manufactured from fire resistant material wherethrough the collected materials are drawn. The primary filter is preferably formed from fire proof or retardant material, as it may be exposed to burning coals. In practice, a fiberglass material has been used to manufacture the primary filter. A cylindrical section of a polyester material commonly known as a coated polyester felt has satisfactorily been used as the secondary filter that is open across its top end and is arranged to slide over the cage and receive a lock ring, or like fastener fitted therearound to connect it to a cylindrical mounting of the lid. The selected material that the secondary filter is formed from is selected to provide for restricting the passage of fine particulates into the vacuum source.

Ring clamps are preferably utilized for releasably mounting the primary filter, that contains the filter support, to a lid outer shelf, and containing the secondary filter whose neck is maintained to a lid cylindrical mounting, the secondary filter maintained across the vacuum source inlet that is preferably a conventional vacuum motor that drives a fan as is suitable for use as a vacuum cleaner. As set out above, the vacuum motor and fan are preferably mounted to the top of the lid that is arranged for releasable mounting, as with lid clamps, across an open end of a pail or drum that is utilized as the housing.

BRIEF DESCRIPTION OF THE DRAWINGS

These and other objects and features of the present invention will become more apparent from the following description in which the invention is described in detail in conjunction with the accompanying drawings.

DETAILED DESCRIPTION

Figure 1:
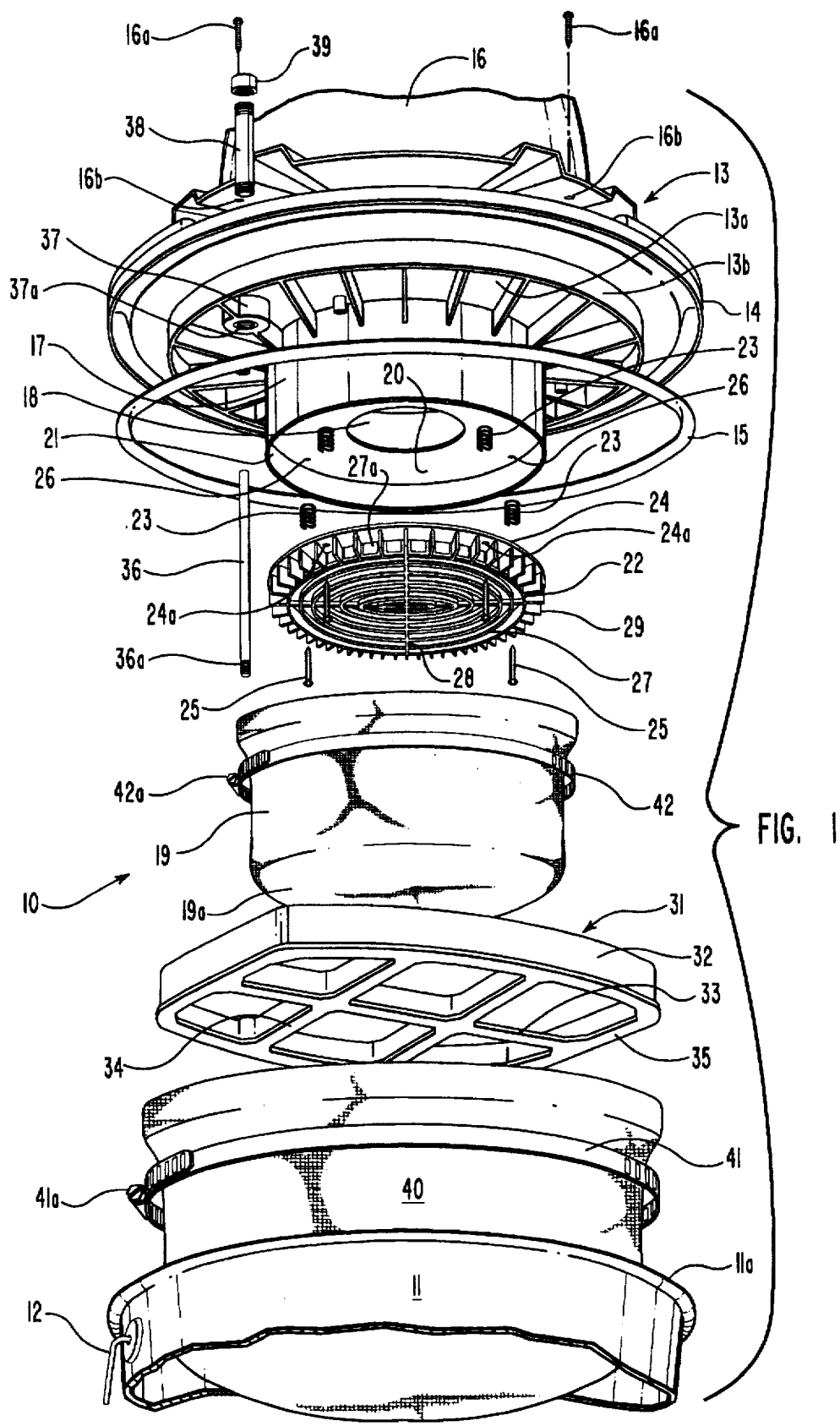
FIG. 1 is an exploded profile perspective view of an ash vacuum containing the present invention showing a lid, whereto is maintained a vacuum motor with a cage aligned for spring mounting across a vacuum inlet and with a filter support, shown as a frame, for mounting to an end of a rod aligned that is fitted through the lid, and showing a secondary filter maintained to the lid undersurface against the edge, above the filter support, and showing a primary filter aligned for mounting to the lid, containing the filter support.

FIG. 1 shows an exploded view of an ash vacuum 10 that includes a housing 11, that is shown as a top portion of a pail that has a movable wire handle 12. A hose, not shown, extends from a fitting formed into the canister side, the hose to include a nozzle, not shown, that is fixed to its end for use in vacuuming up materials, such as residue of a fire, or the like.

The housing 11 has a closed bottom with an open top end that is turned inwardly at 11a to receive curved seat 14 that is formed around the edge of a lid 13. The lid is thereby arranged for fitting over the canister housing open top, and including a ring gasket 15 for fitting in the seat 14 to provide a sealing between the lid curved seat 14 and housing inturned edge 11a. Clamps, not shown, are preferably secured at intervals around the housing 11, for releasably connecting the lid 13, in covering arrangement, over the housing open top end. To provide for lid coupling, the clamps, not shown, preferably each include a body that is pivotally coupled to the side of housing 11, adjacent to top edge 11a, with the other body end pivotally mounting a wire hook end. For damping the lid 13 onto the housing top edge 11a, the wire hook end is pivoted so as to travel over the lid curved seat 14, and the body is then pulled between parallel sides of the wire hook and into engagement with the housing side. So arranged, the lid 13 is releasably clamped to the housing edge 11a with the ring gasket 15 providing a sealing engagement therebetween. This arrangement, as set out above, is shown in our earlier U.S. Pat. No. 5,259,087, that include descriptions of the housing, lid, lid coupling clamps, and hose arrangement, a vacuum source, that is preferably a motor, and its mounting to the lid, which descriptions are hereby adopted by this reference.

Figure 2:
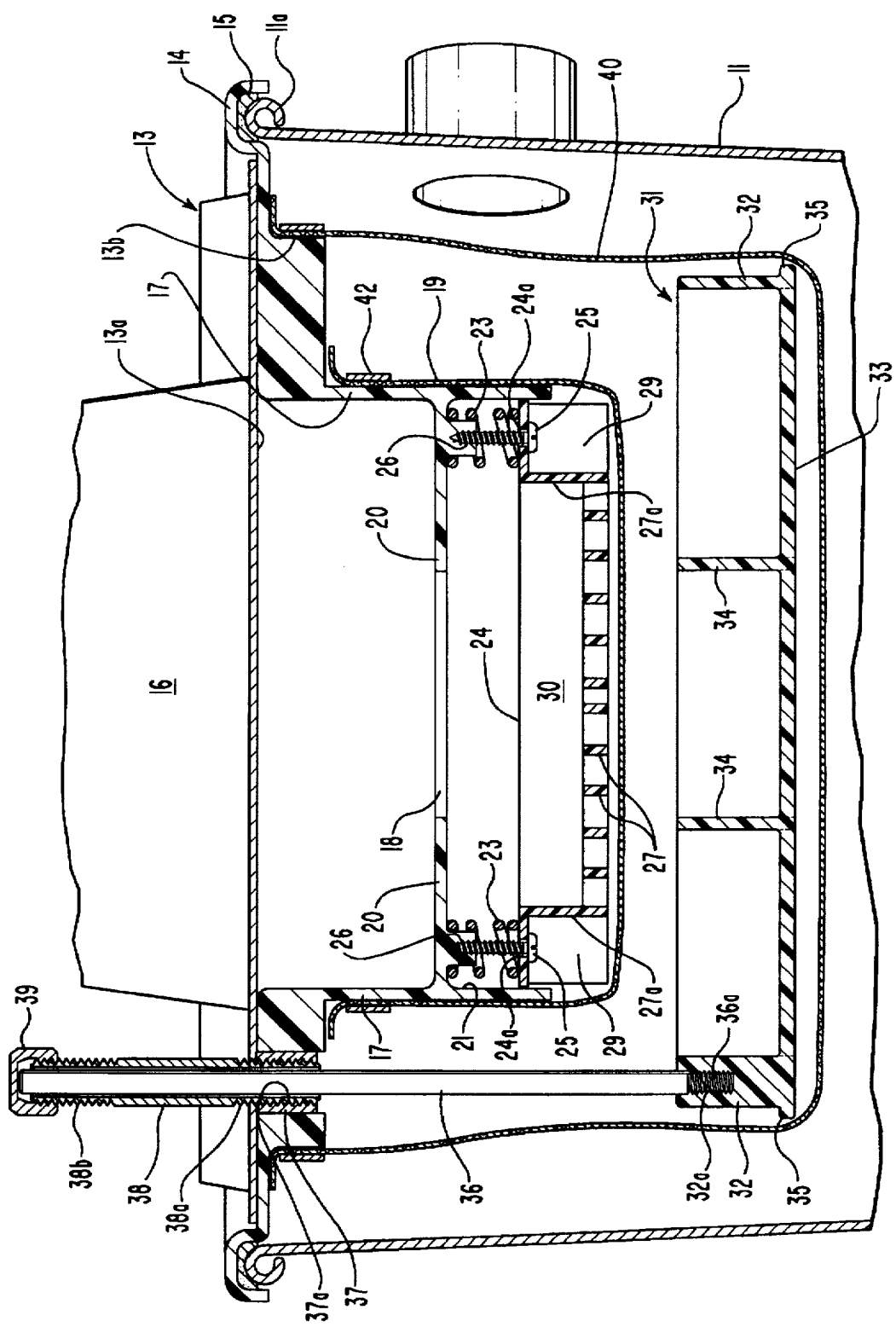
FIG. 2 is an assembled side elevation view of the components of FIG. 1.
Figure 3:
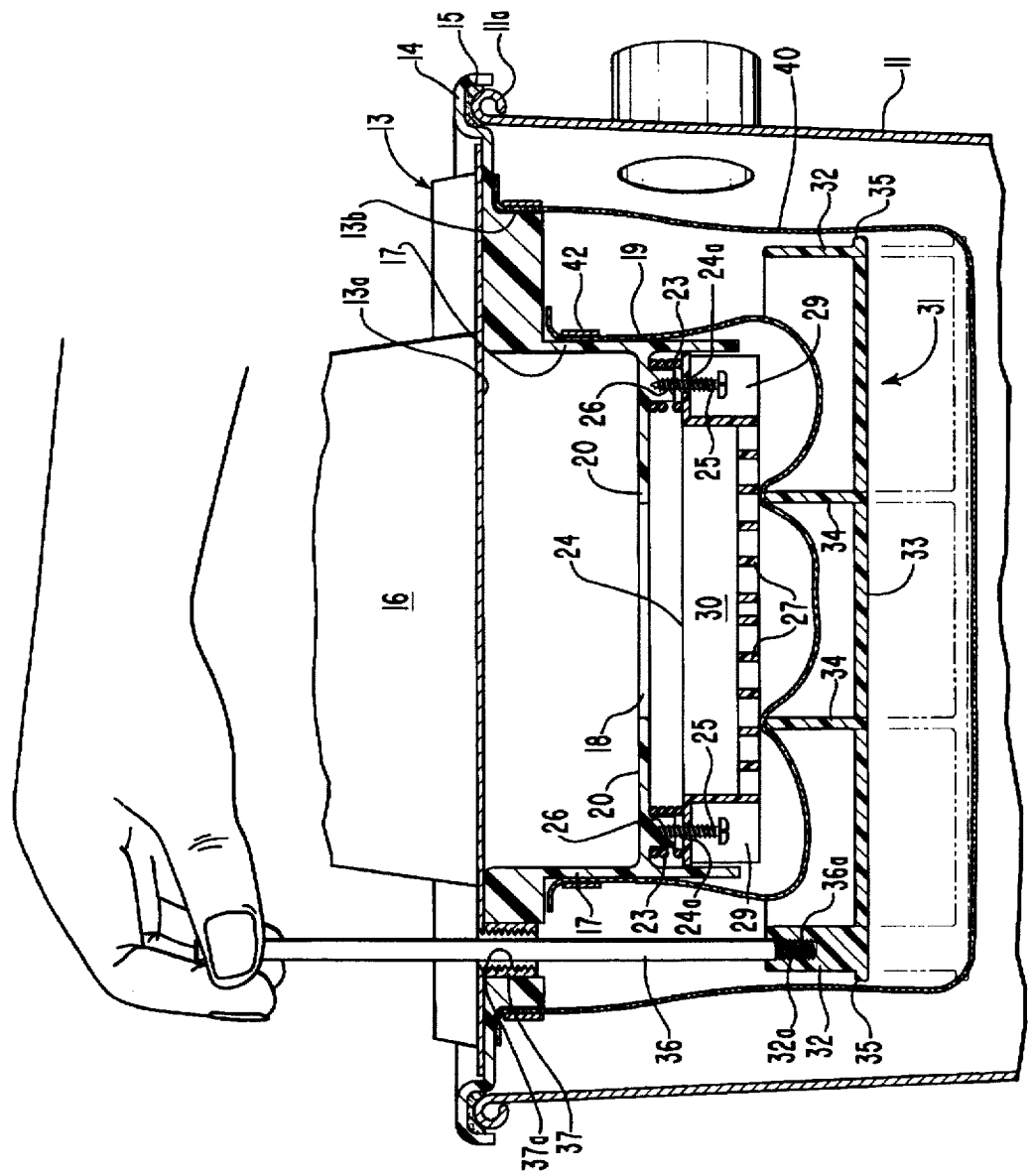
FIG. 3 is a view like FIG. 2 only showing a capped sleeve removed from the lid, with an operator gripping the rod end to shake the filter support so as to strike the inner surface of the primary filter and the secondary filter outer surface, and to urge the cage upwardly against its spring mounting.

The lid 14, as shown in FIGS. 1 through 3, includes a motor cover 16, containing a vacuum source maintained across the center of the top surface of lid 14. The vacuum source, not shown, is preferably an electric motor arranged to turn a fan, not shown, to draw an air flow therethrough. The vacuum source is preferable a commercial unit, and a motor and fan arrangement manufactured by G.S. Electric, has been found in practice to be suitable for such use. The motor cover 16 is releasably maintained as by turning screws 16a through holes 16b that have been formed through a flange of the motor cover, that connect into the lid 13. An electric power cord, not shown, that has a plug end for coupling into a house current source, is preferably included to provide power to the electric motor, and a switch, not shown, is connected electrically to the power source for routing, when switched on, electrical power to the electric motor.

An air flow is pulled through the housing 11, as described, by the turning of the fan, pulls the air flow into the electric motor through a center opening 18 that is formed through a center of secondary filter cylindrical mounting sleeve 17, hereinafter referred to as sleeve 17. The sleeve 17 is to receive a neck of a cylindrically shaped secondary filter 19 having its neck pulled thereover that is closed across its bottom end, shown as a flat section of filter material 19a. The secondary filter 19 neck receives a ting clamp 42 installed thereover. The ring clamp, shown in FIG. 1, includes a turning screw 42a, that, when turned, shortens the clamp diameter to cinch it tightly against the secondary filter surface, locking it onto the sleeve 17, as shown in FIGS. 2 and 3. The sleeve 17 includes a flat plate 20 formed across its interior, wherethrough center opening 18 is formed. The plate 20 edge intersects a straight inner cylindrical wall 21 of sleeve 17. A cage 22, that is shown as a flat round section is arranged for fitting into the sleeve 17, traveling along the inner cylindrical wall 21 towards the flat plate 20. Coil springs 23, as shown best in FIG. 1, are provided to separate a flat top section 24 of cage 22 from the surface of the flat plate 20. Screws 28 are provided for fitting through holes 24a formed through the flat top section 24 for turning into holes 26 that are formed in the flat plate 20. The cage 22 is thereby spring mounted to the undersurface of flat plate 20 and tends to flex towards that flat plate 20 when a force is directed thereagainst, as set out below, and to rebound therefrom after the force is removed, as shown in FIGS. 2 and 3. The cage 22 outer or bottom face is formed with a plurality of circular ridges 27, having successively spaced greater radiuses from an axial center of an open center section, that are maintained to straight arms 28 that extend from the axial center to an outer ridge 27a and are spaced at ninety (90) degree intervals from one another. The outer ridge 27a, as shown, includes a plurality of radial walls 29 that are secured to extend from around an outer surface thereof. The radial walls 29 are spaced at equal distances to one another and are each a radius from the cage center.

The cage 22 is open between the circular ridges 27 and straight arms 28, adjacent to a cage open area 30, to pass an air flow therethrough and into the center opening 18. So arranged, a force applied through the secondary filter bottom 19a is transmitted into the cage 22. Such force on cage 22 acts through the cage flat top section 24 to compress the springs 26, as shown in FIG. 3. Thereafter, when the defecting force is removed, the cage 22 is urged by the springs 26 outwardly to the attitude shown in FIG. 2. In practice, the cage will rebound against the inner surface of the secondary filter bottom 19a, and the outer edges of the cage circular ridges 27 and straight arms 28 are urged into the material of the secondary filter bottom 19a, and the outer edges of the radial walls 29 contact the junction of the secondary filter sleeve 19 with the bottom 19a. In that contact, the filter material tends to bow into the areas between the circular ridges 27, straight arms 28 and radial walls 29. Thereafter, when the cage 22 has rebounded from the attitude shown in FIG. 3, where the filter bottom 19a is spaced apart from cage ridges and arms 27 and 28, respectively, the secondary filter bottom 19a drapes into cavities in a filter support 31, as shown in FIG. 2. The filter bottom material 19a will thereby have been thrust outwardly setting up a wave therein that moves the fabric away from and then back towards the cage. Accordingly, the cage is vibrated on its spring mountings, moving towards and away from the flat plate 20 by the action of filter support 31 striking and disengaging from the filter bottom 19a, effectively shaking that filter bottom 19a to dislodge any collected particles therefrom, that fall into a primary filter 40.

The filter support 31 may be formed of any material but is preferably formed from a heat resistant plastic that is open therethrough with top edges of a center lateral member 33 and longitudinal members 34 to contact when the filter support is moved thereagainst the outer surface of the secondary filter bottom 19a, as shown best in FIG. 3. The filter support 31 is arranged to be moved to bump or strike the surface of the bottom 19a of the secondary filter 19, thereby applying a force through that secondary filter 19 bottom surface 19a into the cage 22, so as to cause, as shown in FIG. 2, the cage to be urged against the biasing of the coil springs 26. The filter support 31 is formed as a frame, as shown best in FIG. 1, to include a continuous outer wall 32 that is formed as a rectangle with rounded surfaces, and contains the a center lateral member 33 with longitudinal members 34 that cross the center lateral member 33 at equidistant intervals. An outwardly projecting lower lip 35 is formed around a bottom edge of the continuous outer wall 32 that is for engaging and scrapping along an inner surface of the primary filter 40, as set out below.

To allow for an operator to move the filter support 31, a straight rod 36 is connected to the primary filter 40 by turning a rod threaded end 36a into a threaded hole 31a, shown in FIGS. 2 and 3, that is formed into the filter support 31. The rod 36 is maintained to extend at a right angle from a filter support narrow side. The straight rod 36 is for passing through a hole 37a that is open through a pier 37 that is formed in the lid 13, the hole 37a exiting the lid top surface. The straight rod 36 is to extend beyond the lid for gripping by an operator's hand, as shown in FIG. 3 who, by moving the straight rod 36, up and down and pivoting it, moves the filter support 31 also. For closing over the hole 37a, the hole 37a is threaded, as shown in FIGS. 2 and 3, to receive a threaded end 38a of a pipe 38 that is turned therein, with the opposite pipe end 38b also threaded to receive a cap 39 turned thereover, as shown in FIG. 2. The cap 39 is positioned over the end of pipe 38 to maintain the vacuum integrity within the housing.

The filter support 31 is maintained in primary filter 40 that is maintained over a footing 13b of lid 13, by fitting a clamp 41 therearound, shown in FIG. 1, the clamp is tightened therearound by a mining of a clamp screw 41a that reduces the clamp diameter, cinching it tightly around the primary filter surface, and binding it against the footing 13b surface, as shown in the FIGS. 2 and 3. So arranged, the secondary filter 19 and primary filter 40 provide a double filter system that are arranged within the canister housing 11 to separate that canister interior from the vacuum source.

In practice, to dislodge collected particles from the primary and secondary filters 40 and 19, respectively, after removal of the sleeve 38, an operator grips the rod 36 to both move it and the connected filter support 31 up and down and to pivot it, as shown in FIG. 3. The upper surface of the filter support 31 thereby engages and scrapes across the bottom surface 19a of the secondary filter 19, and depresses the cage 22 against its coil spring 23 mounting. The cage 22 is thereby moved upwardly along the sleeve wall 21, compressing coil springs 23, and will then rebound against the inner surface of the secondary filter 19. Accordingly, the secondary filter bottom surface 19a is scraped by the filter support as it moves the cage 22 upwardly, with, on release, the cage 22 will rebound to strike the secondary filter interior with edges of the cage circular ridges 27, straight arms 28 and radial walls 29. Collected particles present on the secondary filter 19 surface are thereby shaken out of the filter to fall into the primary filter 40. In which filter support 31 movement, the side 32 and outstanding edge 35, formed along with the filter support bottom, will repeatedly strike the primary filter 40 inner surface, flexing and shaking that surface to dislodge particles collected on its outer surface that fall to the bottom of the housing 11 bottom.

The primary filter 40 is preferably formed from a flame proof material that will not burn should even very hot or burning coals be pulled into the housing 11, or should even such coals continue to burn in the housing. In practice, a fiberglass material has been used successfully for manufacture of the primary filter 40.

Before mounting the primary filter 40, as described above, the secondary filter 19, is mounted as described, to the sleeve 17, utilizing the clamping ting 42. The secondary filter 19 will not be in direct contact with hot coals, or the like, and accordingly need not be manufactured from a flame proof material. In practice, a dose mesh polyester material such as a material known as a coated polyester felt, manufactured by Southern Felt, Inc., has been used successfully for this application. Materials shaken off the secondary filter 19 fall to the bottom of the primary filter 40 and can be later removed by demounting the primary filter 40 off from the footing 13b.

It should be understood that the canister housing 11 can include wheels, casters, or the like, mounted to its bottom end for providing mobility. Further, while a preferred form of our invention in a filter cleaning system for vacuum cleaner has been shown and described herein, it should be understood that the present disclosure is made by way of example only and that variations are possible without departing from the invention subject matter, and a reasonable equivalency thereof, coming within the scope of the following claims, which claims we regard as our invention.

We claim:

1. A filter cleaning system for a vacuum comprising, a housing that is open across a top end and closed across a bottom end, and has a port formed therein for receiving a vacuum hose; a removable lid for attachment, in sealing engagement, over said housing open top end; a vacuum source for mounting to said lid that communicates with the housing interior through an opening in said lid; a filter system that includes first and second filters with each including means for independent mounting to said lid undersurface such that said secondary filter is maintained to a mounting sleeve that extends from said lid undersurface across the vacuum source and said primary filter, that is formed as a bag, is mounted at its neck to said lid undersurface, containing said secondary filter that is formed as a bag to fit with said primary filter and includes a means for maintaining a top edge of said second filter bag onto said mounting sleeve; a filter support that is an open frame and is maintained within said primary filter and includes a straight rod secured at one end to extend at a right angle from said filter support and passes through a rod opening formed through said lid and including means for closing off said rod opening; and cage means arranged across said opening through said lid and is positioned within and in contact with said secondary filter, which said cage means is suspended by spring means from said lid undersurface, which said spring mean allows said cage means to move when said filter support is moved thereagainst, which said cage means movement is translated to an inner surface of secondary filter to dislodge collected particles therefrom.

2. A filter cleaning system for a vacuum as recited in claim 1, wherein the secondary filter is manufacture from a coated polyester felt material.

3. A filter cleaning system for a vacuum as recited in claim 1, wherein the cage means is a flat disk having a diameter to fit across the bottom of the secondary filter, and includes, as a bottom face, a number of successively larger space apart circular ridges arranged in the same plane and extending from a center circular ridge to an outer circular ridge with a plurality of straight arms extending between, and with openings between said ridges and arms wherethrough an air flow is pulled; and the spring means are a plurality of coil springs that are individually mounted, in spaced relationship, to extend from around the cage means, to separate said cage means from a lid bottom surface around the lid opening, and which said spring means are compressed when said cage means is urged towards said lid surface.

4. A filter cleaning system for a vacuum cleaner as recited in claim 3, further including, a plurality of like equally spaced flat walls that are each secured to extend outwardly from an outer surface of a greatest diameter circular ridge.

5. A filter cleaning system for a vacuum cleaner as recited in claim 1, wherein the filter support is an open frame formed from equal width straight lateral and longitudinal sections that cross one another at right angles and connect at their ends to a side wall formed therearound; and said side wall includes a flange that extends at an equal distance outwardly from around a bottom edge thereof and the straight rod is secured at one rod end at a right angle to an end section of said filter support and extends through the rod opening formed through the lid.

6. A filter cleaning system for a vacuum as recited in claim 5, wherein a sleeve is provided as the means for closing off the rod opening that is capped on one end for containing the straight rod.

* * * * *